United States Patent
Roh

(10) Patent No.: US 9,787,040 B2
(45) Date of Patent: Oct. 10, 2017

(54) ENERGY-SAVING POWER STRIP

(71) Applicant: Tae-Wan Roh, Paju-si (KR)

(72) Inventor: Tae-Wan Roh, Paju-si (KR)

( * ) Notice: Subject to any disclaimer, the term of this patent is extended or adjusted under 35 U.S.C. 154(b) by 546 days.

(21) Appl. No.: 14/487,457

(22) Filed: Sep. 16, 2014

(65) Prior Publication Data
US 2015/0076907 A1 Mar. 19, 2015

(30) Foreign Application Priority Data

Sep. 16, 2013 (KR) .................. 10-2013-0111094

(51) Int. Cl.
| | |
|---|---|
| *H02J 3/00* | (2006.01) |
| *H02J 9/00* | (2006.01) |
| *H01R 25/00* | (2006.01) |
| *H01R 13/703* | (2006.01) |
| *H01R 13/514* | (2006.01) |

(52) U.S. Cl.
CPC ....... *H01R 25/003* (2013.01); *H01R 13/7036* (2013.01); *H01R 13/514* (2013.01); *H02J 9/005* (2013.01); *Y10T 307/461* (2015.04)

(58) Field of Classification Search
CPC ...... H02J 3/00; H02J 9/00; H02J 9/005; H02J 2009/007; H01R 25/003; H01R 13/7036; H01R 13/514; H01R 9/00
See application file for complete search history.

(56) References Cited

U.S. PATENT DOCUMENTS

| | | | | |
|---|---|---|---|---|
| 7,771,239 B1* | 8/2010 | Hsiao | .................. | H01R 25/003 439/640 |
| 8,033,867 B1* | 10/2011 | Kessler | ................ | H01R 25/003 439/652 |
| 8,585,444 B2* | 11/2013 | Chang | .................. | H01R 13/627 439/131 |
| 2010/0055930 A1* | 3/2010 | Yue | ...................... | H01R 25/003 439/38 |
| 2010/0261376 A1* | 10/2010 | Hwang | .................. | H01R 13/60 439/501 |
| 2011/0006615 A1* | 1/2011 | Kim | ...................... | H01R 13/665 307/131 |
| 2011/0304208 A1* | 12/2011 | Lee | .......................... | G06F 1/266 307/39 |
| 2013/0015706 A1* | 1/2013 | Chien | ..................... | G06F 1/266 307/38 |

FOREIGN PATENT DOCUMENTS

| | | |
|---|---|---|
| KR | 20-2011-0004254 U | 4/2011 |
| KR | 20-2011-0008260 U | 8/2011 |

* cited by examiner

*Primary Examiner* — Rexford Barnie
*Assistant Examiner* — Terrence Willoughby
(74) *Attorney, Agent, or Firm* — Davis & Bujold PLLC; Michael J. Bujold

(57) ABSTRACT

The panel (220), the energy-saving switch (230), and the connector (240) may be formed in a separable module type corresponding to each of the power sockets (130). The separable module type increases usability, because it is possible to use the modules only for necessary ones of the plugs (P) in the power sockets (130) and not to insert them into the power sockets (130) without a plug (P) connected.

10 Claims, 3 Drawing Sheets

ENERGY-SAVING POWER STRIP

CROSS-REFERENCE TO RELATED APPLICATION(S)

This application claims the benefit under 35 U.S.C. §119 (a) of Korean Patent Application No. 10-2013-0111094, filed on Sep. 16, 2013 in the Korean Intellectual Property Office, the entire disclosure of which is incorporated herein by reference for all purposes.

BACKGROUND OF THE INVENTION

Field of the Invention

The present invention relates to an energy-saving power strip with energy-saving switches for cutting off standby power.

Description of the Related Art

A power strip, which is an electrical product with a plurality of power sockets to connect several electrical devices all together by dividing power from a wall outlet, has a main plug attached to a cable extending for connection to a wall outlet at a distance or has a main plug directly attached to the body of the power strip. Since many electrical products are connected all together, power strips are equipped with a shut-off circuit or a switch to prevent overload.

The plugs of various electrical products are inserted in a power strip that is in use in many cases and the accumulated amount of standby power consumption increases accordingly, and it causes an economic waste. Accordingly, power strips are equipped with energy-saving switches to cut off standby power in some cases.

Power strips where the plugs of several electrical products are gathered are usually placed at inconspicuous places such as corners or gaps in consideration of esthetic appearance, so it is difficult to overcome an effort and inconvenience that users always have to find the power strips in order to save electricity, even if there are energy-saving switches.

Energy-saving power strips that are easy to use by separating energy-saving switches from the power strips and placing them at conspicuous places have been designed. A power strip with a tumbler switch has been proposed in Korean Utility Model Publication No. 2011-0008260 and an electric power strip with remote control switches has been proposed in Korean Utility Model Publication No. 2011-0004254. However, power supplied to those power strips is completely turned on/off at a time, such that it is impossible to cut off power for specific plugs. Further, the power strips disclosed in the documents are focused only on separation of energy-saving switches, such that there is a limit in that it is difficult to satisfy various purposes according to users or use conditions and they are inconvenient.

An object of the present invention is to improve usability for saving energy by separating energy-saving switches from a power strip.

Another object of the present invention is to allow selective use of energy-saving switches of a power strip by making them detachable.

Another object of the present invention is to provide the improvement of external appearance and increase usability by making individual energy-saving switches be combined with the main body of a power strip or be easily combined with each other.

The other objects and advantages of the present invention can be understood from the following description and more clearly understood from the exemplary embodiments of the present invention. Further, it can be easily seen that the objects and advantages of the present invention can be realized by means as illustrated in the claims and a combination thereof.

SUMMARY OF THE INVENTION

In one general aspect, there is provided an energy-saving power strip including; a power strip body with a plurality of power sockets; and energy-saving units connecting or disconnecting power supplied to plugs inserted in the power sockets, in which the energy-saving unit has: insertion holes formed in the power strip body; a panel attachable/detachable to/from the power strip body; an operable energy-saving switch formed on the panel; a connector inserted/separated into/from the insertion holes and allowing power supplied to the plug to flow to the energy-saving switch when being inserted; and a cable extending to connect the energy-saving switch and the connector with each other.

A receiving groove for keeping the cable may be formed in at least any one of the power strip body and the panel.

Holding portions for locking the panels may be formed in the power strip body.

The holding portion may have slots and protrusions formed in a corresponding male-female type on both sides.

The energy-saving power strip may further include panel protrusions and panel slots formed on both sides of the panel to correspond to the slots and protrusions.

The insertion holes may be formed in the power strip body and may include a first terminal that is connected with the plug and a second terminal that is electrically connected with the energy-saving switch, cutting off power supplied to the first terminal, when the connector is inserted.

The first terminal may have: a plug contact portion that is brought in contact with any one terminal of the plug; a connection conductor that is brought in contact with any one of pins of the connector, when the connector is inserted in the insertion holes; and a contact extending to the second terminal.

The second terminal may have an elastic switch that is connected with the other pin of the connector and separated from the contact by the other pin of the connector, when the connector is inserted in the insertion holes.

The panel, the energy-saving switch, and the insertion holes may be formed in a separable module type corresponding to each of the power sockets.

The connector may be formed in at least a pair of pins that can be inserted into the insertion holes.

According to the energy-saving power strip of the present invention, panels with an energy-saving switch and a connector are attachable/detachable to/from the power strip body, such that it is possible to selectively cut off power for plugs inserted in the power strip.

Further, the individual panels are fixed to the power strip body and connected with each other by the same structure, such that it is useful and has a simple structure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
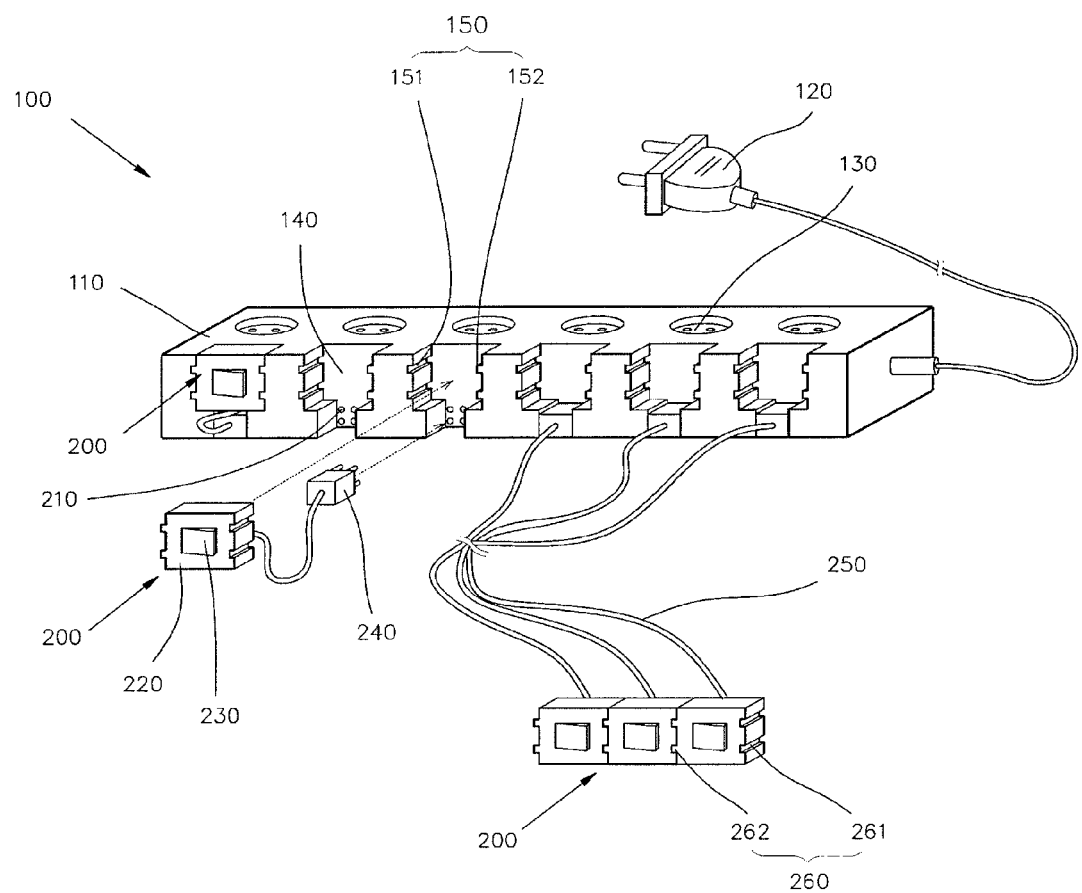
FIG. 1 is a perspective view of an energy-saving power strip 100 according to an embodiment of the present invention.

Hereinafter, exemplary embodiments of the present invention will be described in detail with reference to the accompanying drawings so that the present invention may be readily implemented by those skilled in the art. However, it is to be noted that the present invention is not limited to the exemplary embodiments but can be embodied in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Further, the terms "part", "group", and "module" described herein refer to a unit that processes at least one function or an operation and can be implemented in software, hardware, or a combination of hardware and software.

Hereinafter, an energy-saving power strip 100 according to an embodiment of the present invention will be described in detail with reference to the accompanying drawings.

Figure 2:
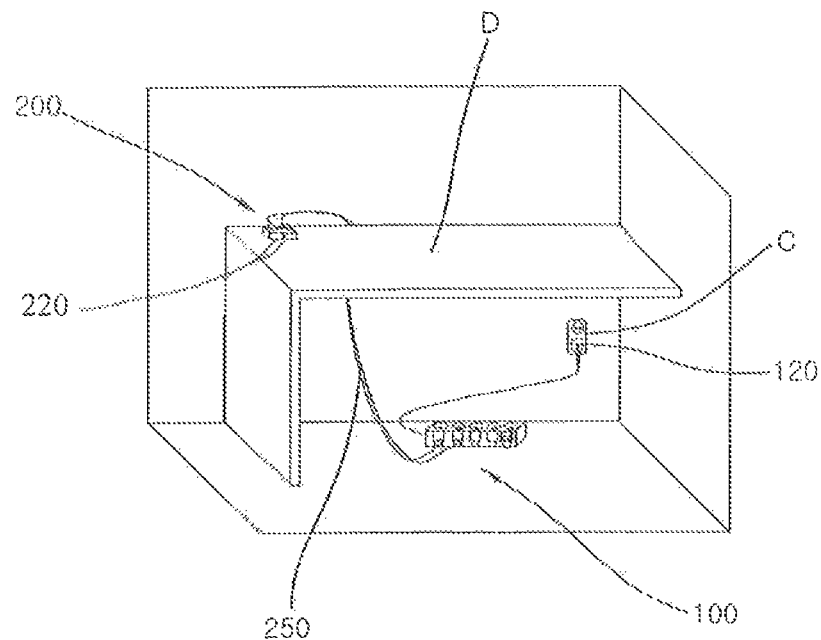
FIG. 2 is a conceptual perspective view illustrating use of the energy-saving power strip 100 according to an embodiment of the present invention.
Figure 3:
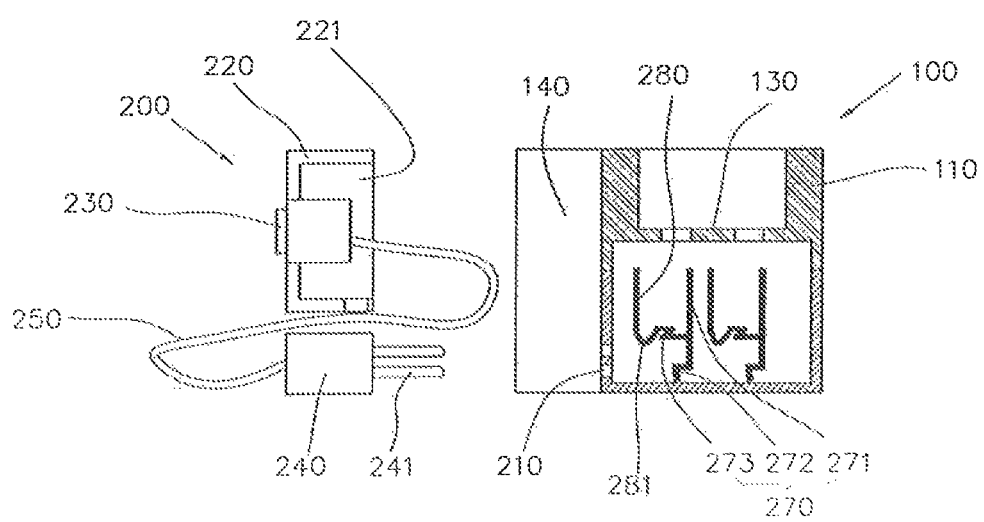
FIG. 3 is a conceptual cross-sectional view illustrating a disassembled state of the energy-saving power strip 100 according to an embodiment of the present invention.
Figure 4:
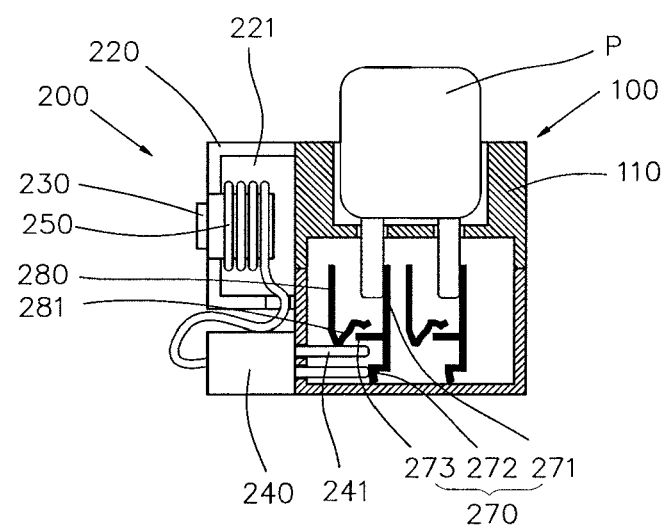
FIG. 4 is a conceptual cross-sectional view illustrating an assembled state of the energy-saving power strip 100 illustrated in FIG. 3.

FIG. 1 is a perspective view of an energy-saving power strip 100 according to an embodiment of the present invention, FIG. 2 is a conceptual perspective view illustrating use of the energy-saving power strip 100 according to an embodiment of the present invention, FIG. 3 is a conceptual cross-sectional view illustrating a disassembled state of the energy-saving power strip 100 according to an embodiment of the present invention, and FIG. 4 is a conceptual cross-sectional view illustrating an assembled state of the energy-saving power strip 100 illustrated in FIG. 3.

As illustrated in these figures, the energy-saving power strip 100 according to an embodiment of the present invention includes a power strip body 110 with a plurality of power sockets 130 and energy-saving unit 200 connecting or disconnecting power supplied to plugs P inserted in the power sockets 130.

The energy-saving units 200 correspond to the power sockets 130, respectively; so seats 140 for inserting or seating the energy-saving units 200 are formed on the power strip body 110.

Holding portions 150 are formed on both sides of the seats 140 so that the energy-saving units 200 can be locked. The holding portion 150 includes slots 151 and protrusions 152 formed in a male-female type on both sides. In terms of the structure or insertion direction, the slots 151 and the protrusions 152 may be formed in a perpendicular insertion type or a horizontal insertion type to the power strip body 110 as illustrated in FIG. 1, or may be implemented by fixing elements such as a magnet or a hook.

The energy-saving unit 200 may have insertion holes 210, a panel 220, an energy-saving switch 230, a connector 240, and a cable 250. The configuration of these parts will be described hereafter.

The panel 220, the energy-saving switch 230, and the connector 240 may be formed in a separable module type corresponding to each of the power sockets 130. The separable module type increases usability, because it is possible to use the modules only for necessary ones of the plugs P in the power sockets 130 and not to insert them into the power sockets 130 without a plug P connected.

The insertion holes 210 are formed in the power strip body 110, and they allow use of the energy-saving switches 230, when the connectors 240 are inserted, as described below.

The energy-saving switch 230 is disposed on the panel 220 and the panel 220 can be attached/detached to/from the power strip body 110. Holding portions 260 that are locked to the holding portions 150 of the power strip body 110 are formed on both side of the panel 220. The holding portions 260 of the panel 220 also include panel protrusions 262 and panel slots 261 to be locked to the slots 151 and the protrusion 152 of the power strip body 110. Accordingly, the panels 220 are locked to the power strip body 110 or may be combined with other panels 220 in a single unit type. Therefore, as illustrated in FIG. 1, the energy-saving units 200 may be mounted and used on the power strip body 110 for some power sockets 130, or the energy-saving units 220 may be separated from the power strip body 110 and operated as a switch panel type with their panels 220 of other energy-saving units 200 connected. FIG. 2 illustrates an example, in which the power strip body 110 is placed under a desk D and some energy-saving units 200 are connected to the power strip body 110 and the panels 220 are placed on the conspicuous top of the desk D.

A receiving groove 221 may be formed on the power strip body 110 or the panel 220 to stow the cable 250. FIGS. 3 and 4 illustrate a double receiving groove 221 formed on the panel 220. The receiving groove 221 can improve the external appearance by preventing the cable 250 is messily exposed when the panel 220 is not used or combined with the power strip body 110. A portion for holding or winding the cable 250 may be provided in the receiving groove 221.

The energy-saving switch 230 is operated to connect or disconnect power supplied to the plug P. An indicator lamp may be disposed on the energy-saving switch 230 or the panel 220 to illustrate that the energy-saving switch 230 is turned on/off.

The connector 240 can be inserted/separated into/from the insertion holes 210, and power supplied to the plug P can flow through the energy-saving switch 230, with the connector 240 inserted. In terms of the shape, the connector 240 may have at least a pair of pins 241 that are inserted into the insertion holes 210. As illustrated in FIG. 1, two pairs of pins 241 corresponding to two terminals in the power socket 130 may be formed, but the number and arrangement may be implemented in various ways. FIGS. 3 and 4 illustrate the internal operation according to insertion of the pins 241.

Referring to FIGS. 3 and 4, first terminals 270 and second terminals 280 for connection with a ping P are provided in the power strip body 110. The first terminal 270 is an individual electrode for connection with any one terminal of the plug P inserted in a power socket 130 and the second terminal 280 is a common electrode connected to the power socket 130 of the power strip body 110. The second terminal 280 is electrically connected with an energy-saving switch 230, cutting off power supplied to the first terminal 270, when a connector 240 is inserted.

In detail, the first terminal 270 has a plug contact portion 271 for contact with any one terminal of a plug P, a connection conductor 272 for connection with any one of the pins 241 of the connector 240 inserted in the insertion holes 210, and a contact 273 extending to the second terminal 280.

On the other hand, the second terminal 280 has an elastic switch 281 that is connected with the other pin 241 of a connector 240 and separated from the contact 273 by the other pin 241, when the connector 240 is inserted in the insertion holes 210. On the contrary, when the connector 240 is separated from the insertion holes 210, the first terminal 270 and the second terminal 280 are connected by elasticity of the elastic switch 281 (see FIG. 3).

According to this configuration, when the connector 240 is inserted, one of the pins 241 of the connector 240 comes in contact with the elastic switch 281 first and disconnects the elastic switch 281 from the contact 273 of the first terminal 270. Further, the other pin 241 of the connector 240 comes in contact with the connection conductor 272 of the first terminal 270. Accordingly, the terminals of the plug P can be connected to the energy-saving switch 230 by insertion of the connector 240.

Although any one terminal of the plug P is mainly illustrated in FIGS. 3 and 4 for the convenience of description, the other terminal of the plug P can be connected/disconnected in the same way by the connector 240. In this case, a separate operation member for transmitting an external force due to insertion of the pins 241 of the connector 240 may be added.

The power strip is not limited to the configuration and method of the embodiments described above. The embodiments may be selectively partially or fully combined for various modifications.

The above-described exemplary embodiments can be selectively combined in whole or in part to achieve various modifications thereof.

It should be noted that the exemplary embodiments are given for illustration, but none are intended to be limiting. Further, those skilled in the art may appreciate that various other exemplary embodiments can be implemented without departing from the spirit and scope of the present invention.

What is claimed is:

1. An energy-saving power strip comprising:
   a power strip body having a plurality of power sockets;
   a plurality of insertion holes being formed in the power strip body; and
   a plurality of energy-saving units for connecting or disconnecting power supplied to a respective plug inserted into one of the plurality of power sockets,
   wherein each of the plurality of the energy-saving unit includes:
   a panel which is each attachable to or detachable from the power strip body;
   an operable energy-saving switch is formed on the panel;
   a connector is insertable into or separatable from one of the plurality of insertion holes and allowing power supplied to the plug to flow to the energy-saving switch, when inserted; and
   a cable connects the energy-saving switch and the connector with one another,
   wherein plurality of the insertion holes are formed in the power strip body and include a first terminal that is connected with the plug, and a second terminal that is electrically connected with the energy-saving switch for cutting off power supplied to the first terminal, when the connector is inserted.

2. The energy-saving power strip of claim 1, wherein a receiving groove, for retaining the cable, is formed in at least one of the power strip body and the panel.

3. The energy-saving power strip of claim 1, wherein seats, in which a respective one of the panels are seated, are formed in the power strip body.

4. The energy-saving power strip of claim 3, wherein holding portions, for locking the panels, are formed in the power strip body.

5. The energy-saving power strip of claim 4, wherein the holding portion includes slots and protrusions formed in a corresponding male-female type on opposite sides of the respective seat.

6. The energy-saving power strip of claim 5, the holding portion comprise panel protrusions and panel slots formed on both sides of the panel to correspond to the body slots and body protrusions formed in the power strip body.

7. The energy-saving power strip of claim 1, wherein the first terminal includes:
   a plug contact portion that is brought in contact with any one terminal of the plug;
   a connection conductor that is brought in contact with a first pin of the connector, when the connector is inserted in one of the plurality of insertion holes; and
   a contact extending to the second terminal.

8. The energy-saving power strip of claim 7, wherein the second terminal includes an elastic switch that is connected with second pin of the connector and separated from contact by the second pin of the connector, when the connector is inserted in the insertion holes.

9. The energy-saving power strip of claim 1, wherein the panel, the energy-saving switch, and the insertion holes are formed in a separable module type corresponding to each of the plurality of power sockets.

10. The energy-saving power strip of claim 1, wherein the connector includes at least a pair of pins that are inserted into one of the plurality of insertion holes.

* * * * *